United States Patent [19]
Sugitani et al.

[11] Patent Number: 5,950,718
[45] Date of Patent: Sep. 14, 1999

[54] HEAT EXCHANGE TUBES

[75] Inventors: Junichi Sugitani, Hirakata; Ken-ichi Mae, Naga-gun; Masao Furuta, Minoo, all of Japan

[73] Assignee: Kubota Corporation, Osaka, Japan

[21] Appl. No.: 08/814,693

[22] Filed: Mar. 11, 1997

Related U.S. Application Data

[63] Continuation of application No. 08/499,396, Jul. 7, 1995, abandoned.

[30] Foreign Application Priority Data

Jul. 11, 1994 [JP] Japan .................................. 6-158387
Jun. 5, 1995 [JP] Japan .................................. 7-137785

[51] Int. Cl.$^6$ .................................................. F28F 13/18
[52] U.S. Cl. ...................... 165/133; 165/146; 165/184; 165/182; 165/181
[58] Field of Search ................................. 165/181, 184, 165/183, 147, 146, DIG. 525, DIG. 524, DIG. 522

[56] References Cited

U.S. PATENT DOCUMENTS

| | | | |
|---|---|---|---|
| 2,613,065 | 10/1952 | Didier | 165/146 |
| 3,739,841 | 6/1973 | Small et al. | 165/146 |
| 4,235,844 | 11/1980 | Sterzel et al. | 165/147 X |
| 4,314,587 | 2/1982 | Hackett | 165/184 X |
| 4,700,771 | 10/1987 | Bennett et al. | 165/146 X |
| 4,776,177 | 10/1988 | Jancic et al. | 165/147 X |
| 4,809,415 | 3/1989 | Okayama et al. | |

FOREIGN PATENT DOCUMENTS

| | | | |
|---|---|---|---|
| 0 591 094 A1 | 4/1994 | European Pat. Off. | |
| 2 410 238 | 6/1979 | France | |
| 58-47994 | 3/1983 | Japan | |
| 0185094 | 9/1985 | Japan | 165/146 |
| 4-47719 | 8/1992 | Japan | |
| 1002795 | 3/1983 | U.S.S.R. | 165/146 |
| 1076733 | 2/1984 | U.S.S.R. | 165/146 |
| 1449-818 | 1/1989 | U.S.S.R. | |

*Primary Examiner*—Christopher Atkinson
*Attorney, Agent, or Firm*—Armstrong, Westerman, Hattori, McLeland and Naughton

[57] ABSTRACT

A heat exchange tube useful as a reactor tube for producing ethylene and highly improved in heat transfer efficiency has fins formed on the inner surface of wall of the tube in one or a plurality of regions or all regions arranged from an inlet end of the tube to an outlet end thereof axially of the tube. The fins are positioned in a direction intersecting the axis of the tube and have a suitable pitch. The fins are formed by a projection helically extending on the tube wall inner surface around the axis or are each in the form of an annular projection circumferentially extending on the inner surface in a direction intersecting the axis at right angles therewith. The pitch of the fins, the angle of intersection of the fins with the axis and the height of the fins are suitably determined in conformity with the inside diameter of the tube.

9 Claims, 5 Drawing Sheets

REGION:TEMP. (° K)
a : 1093~1120
b : 1120~1140
c : 1140~1160
d : 1160~1180
e : 1180~1200
f : 1200~1220
g : 1220~1240
h : 1240~1260
i : 1260~1280
j : 1280≦

REGION:TEMP. (° K)
a : 1093~1120
b : 1120~1140
c : 1140~1160
d : 1160~1180
e : 1180~1200
f : 1200~1220
g : 1220~1240

| REGION | TEMP. (° K) |
|---|---|
| a | 1093~1120 |
| b | 1120~1140 |
| c | 1140~1160 |
| d | 1160~1180 |
| e | 1180~1200 |
| f | 1200~1220 |
| g | 1220~1240 |
| h | 1240~1260 |
| i | 1260~1280 |
| j | 1280≦ |

HEAT EXCHANGE TUBES

This application is a continuation of application Ser. No. 08/499,396 filed Jul. 7, 1995, now abandoned.

FIELD OF INDUSTRIAL APPLICATION

The present invention relates to heat exchange tubes which are outstanding in heat transfer efficiency and useful, for example, as thermal cracking reactor tubes in ethylene plants (ethylene cracking tubes).

BACKGROUND OF THE INVENTION

In thermal crackers for producing ethylene, a hydrocarbon material such as naphtha, natural gas or ethane is fed to a reactor tube as a fluid mixture (about 700° K in temperature) with steam and heated to a specified temperature (about 1090° K) with heat supplied from outside while being passed through the tube at a high velocity (e.g., about 0.1 to 0.8 second to flow through the reactor tube when the tube is about 10 to about 13 m in length), whereby olefins such as ethylene, propylene and the like are produced by thermal cracking.

It is required for the thermal cracking operation to effect efficient heat transfer to the fluid passing through the tube at a high velocity and to rapidly heat the fluid to the reaction temperature range up to the central portion thereof. At the same time, unnecessary heating to a high temperature beyond the cracking temperature range must be avoided to the greatest possible extent. The reason is that if the hydrocarbon material is retained in a high temperature range beyond the cracking temperature range for a long period of time, the material becomes converted into lighter fractions (for example, methane and free carbon) to excess or the cracked product undergoes polycondensation or like reaction, consequently reducing the yield of the desired product greatly while permitting the deposition of free carbon on the tube inner surface to result in the disadvantage of necessitating more frequent decoking.

To assure the reactor tube of an improved heat transfer efficiency and to heat up the fluid inside the tube rapidly, it is conventional practice to decrease the bore diameter of the tube (for example, to not larger than 40 mm) and increase the heat transfer surface area relative to the content volume. Further heat exchange tubes have been proposed which, as shown in FIG. 12, are formed with a corrugated inner wall surface, with ridges and furrows extending helically or in parallel to the tube axis, thus shaped ingeniously in cross section and thereby given an increased heat transfer area (Unexamined Japanese Patent Publications No. 173022/1983 and No. 127896/1989).

Although a decrease in the diameter of the reactor tube is effective for transferring heat to the fluid inside the tube more efficiently, it is then required that an increased number of reactor tubes be installed in the cracker to compensate for the decrease in the tube diameter if the apparatus is to remain unchanged in ethylene production capacity. This renders the apparatus more cumbersome to operate and maintain while the decrease in the tube diameter entails the drawback that free carbon is liable to become deposited on the tube wall in a shortened period of time.

The reactor tube of FIG. 12 wherein the inner wall surface is corrugated merely achieves an improvement in heat transfer efficiency generally corresponding to the increase in the tube wall inner surface area and can not be expected to attain a remarkably improvement in any other function over usual tubes (having a smooth inner wall surface with no corrugation).

In view of the foregoing problems, the present invention provides a novel heat exchange tube which achieves a remarkably improved efficiency in transferring heat to the fluid flowing therethrough without necessitating a reduction in its inside diameter and which is rapidly heatable for the fluid to a required temperature up to its central portion, the tube being adapted for use in thermal crackers for producing ethylene to make it possible to greatly increase the production capacity thereof and render the apparatus compact in design and easy to operate and maintain.

SUMMARY OF THE INVENTION

The heat exchanger tube of the present invention is characterized in that fins positioned in a direction intersecting the axis of the tube are formed on the inner surface of wall of the tube in one or a plurality of regions or all regions arranged from an inlet end of the tube to an outlet end thereof axially of the tube, the fins having a suitable pitch.

The fins are formed by a helical projection extending helically on the tube wall inner surface axially of the tube, or are each in the form of an annular projection circumferentially extending on the tube wall inner surface around the axis of the tube.

The region or regions where the fins are to be formed in the interior of the tube from the inlet end to the outlet end, the angle of intersection of the fins with the tube axis, the fin pitch, etc. are suitably determined in accordance with specific conditions such as the operating conditions of the heat exchange tube, heat transfer efficiency required, permissible range of pressure losses, etc.

The fins formed on the tube wall inner surface in a direction intersecting the tube axis (at right angles therewith or obliquely) act as agitating elements on the fluid inside the tube, causing heat to be transferred through the tube wall to the fluid inside the tube with an improved efficiency as the effect of the turbulence formed by agitation.

Thus, unlike the conventional heat exchange tube which is improved in heat transfer efficiency by an increase of heat transfer area of the tube wall, the present invention depends solely on the formation of turbulence by the agitating action of the fins on the fluid inside the tube to produce a great fluid mixing effect and thereby realize homogenization or a uniform temperature distribution of the fluid radially from the tube wall to the tube axis over the entire cross section and rapid heating to the required temperature.

Although ensuring rapid heating of the fluid inside the tube, the fins formed on the tube wall inner surface are responsible to an increase in the pressure loss of the fluid, whereas a high heat transfer efficiency can be achieved by effective agitation while suppressing the pressure loss within limits not objectionable to the actual operation by designing the fins in conformity with the inside diameter of the tube, for example, by suitably determining the angle of intersection of the fins with the tube axis and the fin pitch.

DETAILED DESCRIPTION OF THE INVENTION

Figure 1:
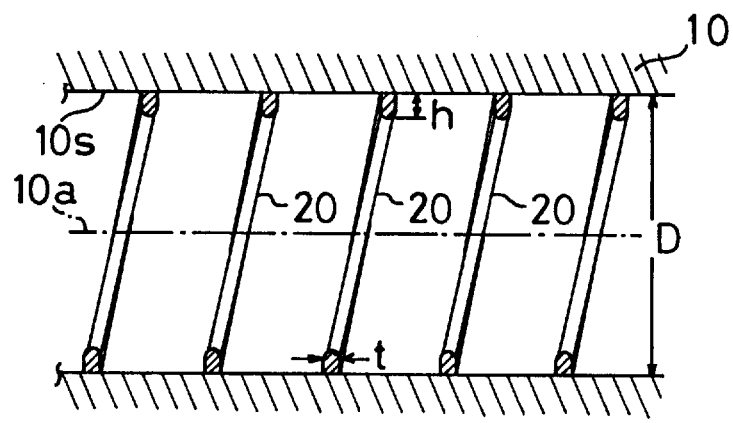
FIG. 1 is a view in axial section of a tube having fins formed by a helical projection.
Figure 2:
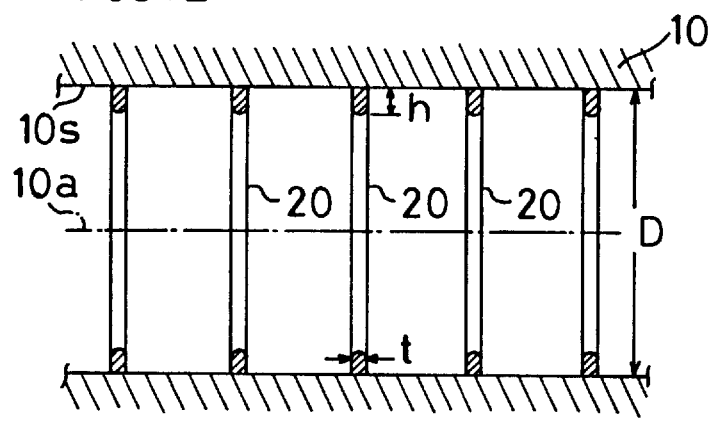
FIG. 2 is a view in axial section of a tube having fins each in the form of an annular projection.

FIGS. 1 and 2 show examples of arrangements of fins formed on the inner surface of a tube wall according to the invention. Indicated at 10 in FIG. 1 is a tube, at 10$a$ the axis of the tube, and at 10$s$ the inner surface of wall of the tube. Fins 20 are formed by a helical projection helically extending on the tube wall inner surface axially of the tube. FIG. 2 shows fins 20 each in the form of an annular projection circumferentially extending on the tube wall inner surface around the tube axis 10$a$.

FIG. 1 shows an example wherein the fins are made continuous in the form of a single helical projection, whereas such fins may be formed by a plurality of helical projections.

Figure 3:
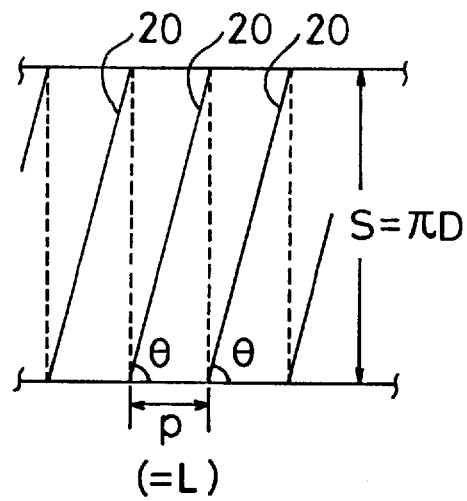
FIG. 3 is a development of the inner surface of wall of the tube having the helical projection.

FIG. 3 is a development of the tube having the fins 20 formed by the helical projection to show the helical pattern on the tube wall inner surface. Indicated at θ is the angle of intersection of the fin 20 with the tube axis 10$a$, at p the pitch of fins 20, and at S the circumference (=πD where D is the inside diameter of the tube). The pitch p of the fins 20 which are formed by a single helical projection is equal to the distance of axial advance of a point in the helical projection for a complete turn about the tube axis, i.e., lead L (=πD/tan θ). The pitch p of helical fins 20 as formed by a plurality of helical projections can be optionally determined as the spacing (axial distance) between the adjacent helical projections.

Figure 4:
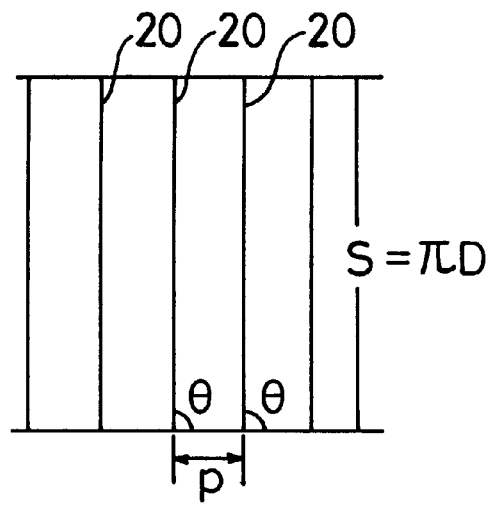
FIG. 4 is a development of the inner surface of wall of the tube having the annular projections.

FIG. 4 is a development of the inner surface of wall of the tube having the fins which are annular projections. The angle of intersection, θ, of the fin is 90 degrees, and the pitch p is an optional value determined as an axial spacing between the adjacent fins 20.

Figure 5:
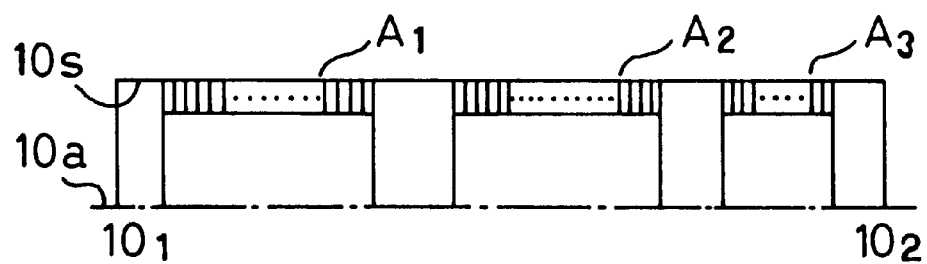
FIG. 5 is a diagram in axial section showing an example of distribution of fins on the inner surface of a tube wall.

The fins on the tube wall inner surface are formed in one region along the axial length of the tube from an inlet end $10_1$ thereof to its outlet end $10_2$, or in a plurality of regions arranged axially of the tube as shown in FIG. 5. (The drawing shows an example wherein the fins are formed in three regions $A_1$, $A_2$ and $A_3$ arranged from the tube inlet end $10_1$ to the outlet end $10_2$.) Alternatively, the fins are formed over the entire region A of the tube from the inlet end $10_1$ to the outlet end $10_2$.

The fins inside one tube are those formed by a helical projection or those comprising annular projections, or a combination of the two types. For example, annular projection fins are provided in the region $A_1$, and helical projection fins in the regions $A_2$ and $A_3$ in FIG. 5. Thus, helical projections and annular projections are selectively combined as desired.

The fins 20 on the tube wall inner surface serve as elements for agitating the fluid inside the tube to transfer heat to the fluid with an improved efficiency, and at the same time, become a factor to increase the pressure loss of the fluid, whereas a rapid heating effect due to the improved heat transfer efficiency can be assured while suppressing the increase in the pressure loss by suitably determining, for example, the pitch p and the intersection angle 9 of the fins in conformity with the inside diameter of the tube.

Figure 6:
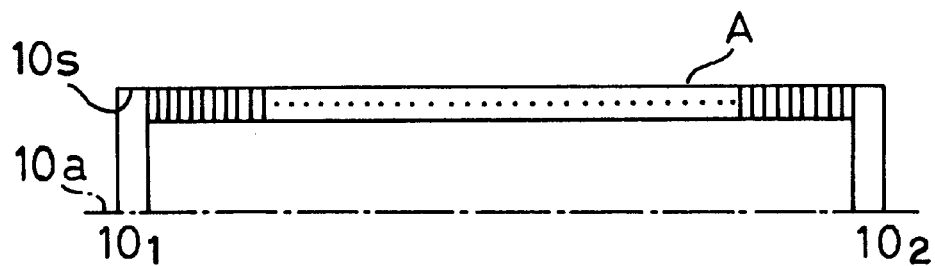
FIG. 6 is a diagram in axial section illustrating another example of distribution of fins on the inner surface of a tube wall.

Varying the fin pitch p from region to region inside the tube is an effective method of assuring balance between the improvement in heat transfer efficiency and the suppression of pressure loss. For example, in the case where fins are provided in discrete regions arranged axially of the tube as shown in FIG. 5, the fin pitch in an optional one of the regions is made different from the fin pitch of the region adjacent thereto, and the different pitches p are repeated axially of the tube. In the case where fins are formed in almost the entire region of the tube as shown in FIG. 6, the entire region can be divided into a plurality of consecutive subregions, with every two adjacent subregions made different from each other in fin pitch p to repeat the different pitches p axially of the tube.

With the tube formed with fins in some regions or in the entire region thereof, the fin pitch $p_1$ of an upstream portion of the tube from the inlet end to an intermediate portion thereof is made relatively small, and the fin pitch $p_2$ of a downstream portion of the tube is made relatively large ($p_1<p_2$) This assures the upstream portion of rapid heating due to a strong agitating action while suppressing an increase in the pressure loss in the downstream portion extending to the outlet end. When it is desired to rapidly heat the fluid in the downstream portion of the tube by vigorous agitation, the relation between the upstream portion and the downstream portion as to the fin pitch is reversed ($p_1>p_2$).

The height h of the fins (see FIGS. 1 and 2) is suitably determined, for example, in conformity with the inside diameter D of the tube. The heat transfer efficiency can be improved by agitation while suppressing the increase in the pressure loss, by making the fins formed in different positions inside the tube, for example, in the adjacent regions, different in height h, or by giving a relatively large height h to the fins in the upstream portion (or the downstream portion) of the tube and making the fins in the downstream portion (or the upstream portion) small in height.

In order to rapidly heat up a gas fluid passed through the ethylene producing reactor tube at a high velocity, it is desired to form fins in at least three regions along the axis of the tube or over the entire length of the tube. When the reactor tube is up to about 150 mm in inside diameter D, it is suitable that the tube be about 20 to about 350 mm in pitch p, at least about 15 degrees in intersection angle θ and about 1 to about 15 mm in fin height h. In the case where fins are provided in a plurality of discrete regions along the tube axis, each of these regions preferably has an axial length of at least about 1 m, and the adjacent regions are spaced apart by a distance, for example, of about 50 to about 2000 mm. In the case where fins are formed in almost the entire region of the tube and when the entire region is divided into a a plurality of consecutive subregions which are made different from one another, for example, in pitch p, each subregion may have an axial length of at least about 1 m. The fins have a thickness t which is determined within the limits of about 5 to about 10 mm, for example, according to the inside diameter of the tube.

Given below are examples of reactor tubes for producing ethylene which have fins formed by a helical projection with consideration given to a balance between rapid heating and pressure loss suppression.

Reactor tube about 150 to 100 mm in inside diameter D intersection angle θ: 40–85°, pitch p: 20–150 mm.

Reactor tube about 100 to 50 mm in inside diameter D intersection angle θ: 25–65°, pitch p: 50–300 mm.

Reaction tube up to about 50 mm in inside diameter D intersection angle θ: 25–45°, pitch p: 50–300 mm.

Also given below are examples having fins which are annular projections (90 degrees in intersection angle θ) in place of helical projection fins.

Reactor tube about 150 to 100 mm in inside diameter D pitch p: 50–150 mm.

Reactor tube about 100 to 50 mm in inside diameter D pitch p: 100–350 mm.

Reactor tube up to about 50 mm in inside diameter D pitch p: 100–350 mm.

Fins are formed in these reactor tubes in various modes described above, for example, by varying the pitch p or fin height h from region to region axially of the tube.

EXAMPLES

A tube (test tube A) formed with fins on the tube wall inner surface according to the invention was subjected to a thermal fluid analysis under conditions simulating the operating conditions of reactor tubes for producing ethylene with the result to be described below. The arrangement of fins formed and the analysis conditions are as follows.

(1) Tube wall
   Inside diameter D: 60 mm, length: 10 m.
(2) Arrangement of fins
   Fins each comprising an annular projection were formed in almost the entire region of the tube from the inlet end to the outlet end as shown in FIG. 6 (fin height h 3 mm, thickness t 5 mm).
   The fin pitch p was 100 mm in an upstream portion (over about 40% of the entire length of the tube from its inlet end) and 300 mm in a downstream portion (over about 60% of the tube length).
(3) Tube wall temperature: 1300° K
(4) Fluid inside the tube
   Flow rate: 100 m/s (residence time 0.1 sec)
   Temperature (inside the inlet end): 700° K
   Coefficient of kinematic viscosity: 102.7 mm$^2$/s
   Reynolds number: 48685

Figure 7:
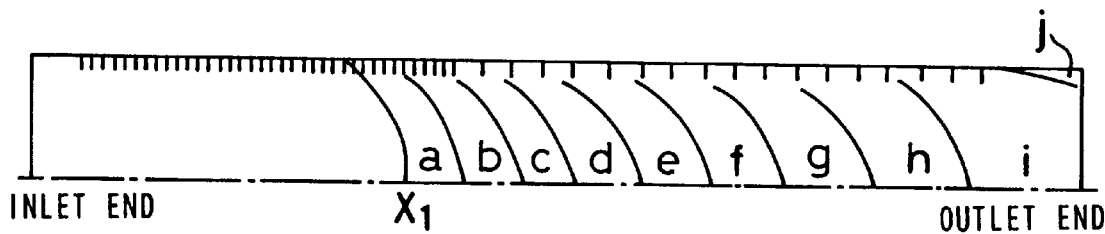
FIG. 7 is a diagram showing a temperature distribution of a fluid inside a heat exchange tube having fins.

FIG. 7 shows the temperature distribution of the fluid inside the test tube A as determined by the fluid analysis. The temperature zone for the thermal cracking reaction for producing ethylene is a region a (1093–1120° K).

Figure 8:
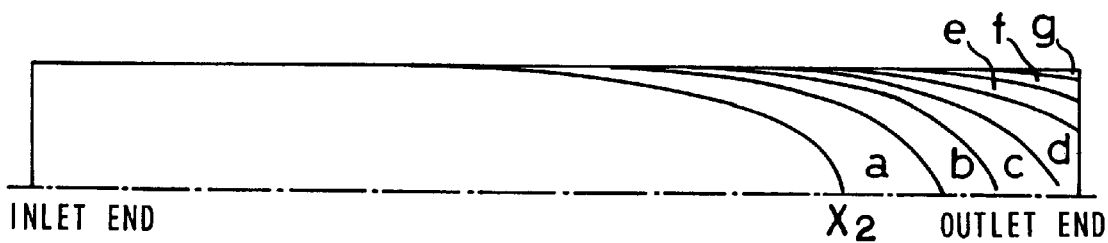
FIG. 8 is a diagram showing a temperature distribution of the fluid inside a heat exchange tube having no fins.

A tube having no fins (test tube B, the same as the test tube A with respect to the inside diameter D and tube length) was subjected to a fluid analysis under the same conditions as above. FIG. 8 shows the temperature distribution of the fluid inside the tube determined.

FIGS. 7 and 8 reveal the following. The test tube B (FIG. 8) having no fins has a great temperature gradient radially of the tube. It is after passing through about 4/5 of the entire length of the tube B (position $x_2$) that the fluid in the vicinity of the tube reaches the temperature region a required for the thermal cracking reaction. On the other hand, the finned test tube A (FIG. 7) has a very small temperature gradient radially of the tube. By the time the fluid passes through about 2/5 of the tube length (position $x_1$), the fluid reaches the temperature region a needed for the thermal cracking reaction and is heated up so rapidly as to reach a temperature region i.

Figure 9:
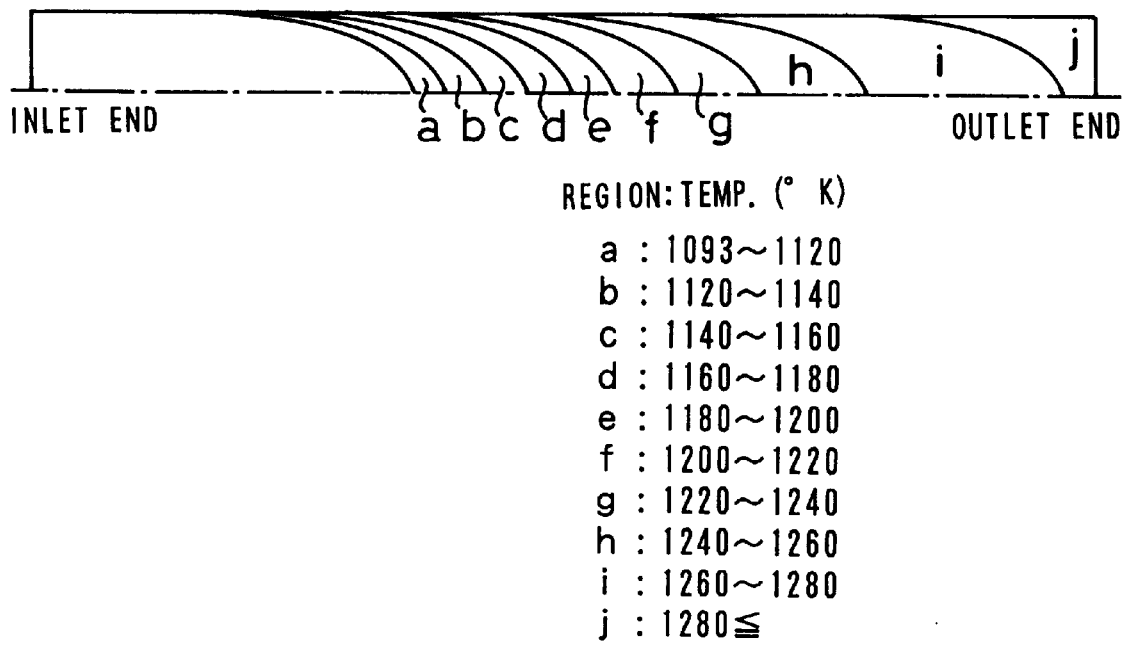
FIG. 9 is a diagram showing a temperature distribution of the fluid inside a heat exchange tube having no fins.
Figure 10:
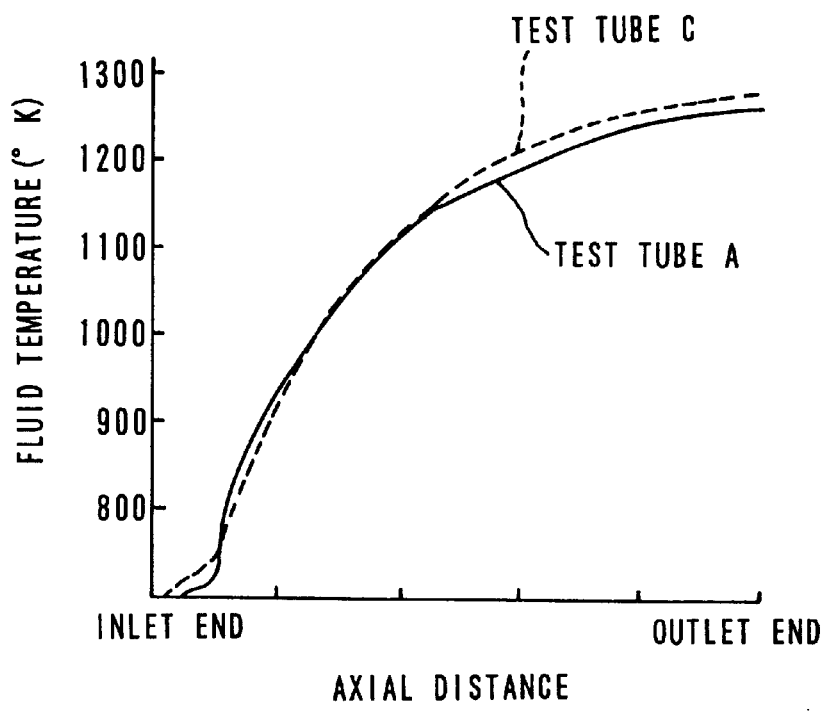
FIG. 10 is a graph showing the fluid temperatures at the axial portions of the tubes shown in FIGS. 7 and 9.

FIG. 9 shows the result obtained by using another tube (test tube C) having no fins like the test tube B for heating under substantially the same conditions as the test tube A. The test tube C was 38 mm in inside diameter D. FIG. 10 shows fluid temperatures at the axial portions of the test tube C and the test tube A. The test tube C having no fins on its inner surface is equivalent to the finned test tube A in heat transfer efficiency but the inside diameter (D=38 mm) of the tube C is much smaller than the inside diameter (D=60 mm) of the tube A. This means that as an advantage of the fins provided on the tube wall inner surface, the finned tube can be given a greatly increased inside diameter for use as a tube of large diameter unlike the tube having no fins.

Figure 11:
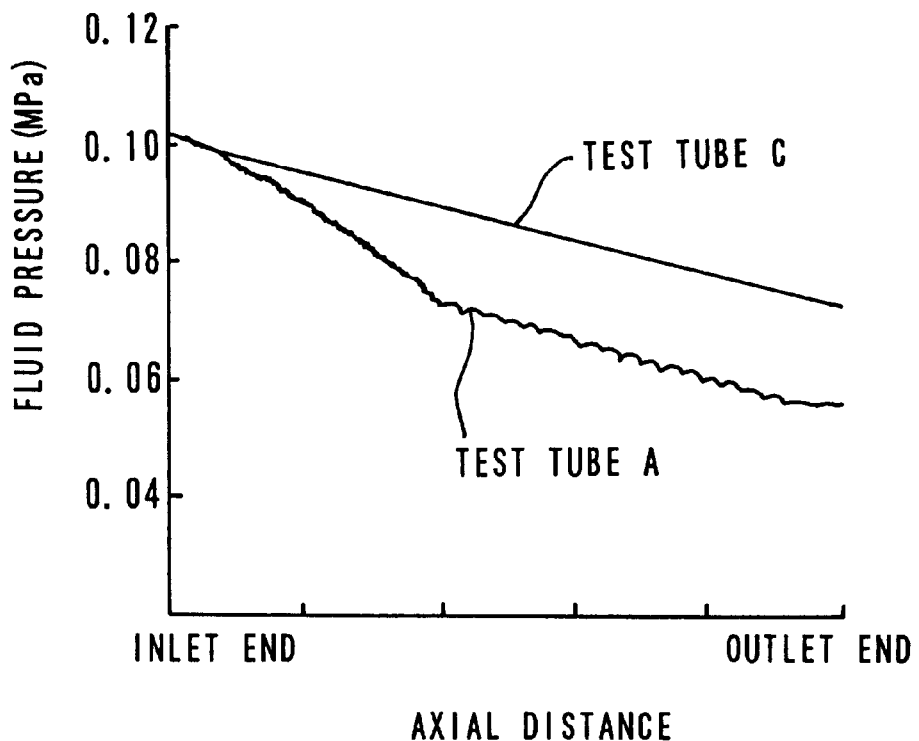
FIG. 11 is a graph showing the fluid pressures inside the same tubes.
Figure 12:
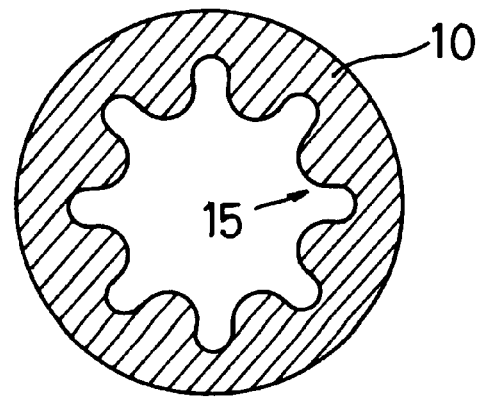
FIG. 12 is a view in cross section showing a conventional example of heat exchange tube.

FIG. 11 shows variations in the pressure of fluid along the tube axis (pressure losses with the tube inlet end taken as a reference point) as measured for the test tube A (with fins) and the test tube C (with no fins). The test tube A is greater than the test tube C in pressure losses but is still maintained at a loss level not objectionable to the thermal cracking operation. When desired, the test tube A can be made equivalent to the test tube C with respect to pressure variations at the outlet end by slightly lowering the velocity of the fluid through the tube.

Incidentally, FIG. 11 shows that the pressure gradient of the test tube A is much smaller at the right side (downstream side) of point I than at the left side (upstream side) thereof. This change in the gradient corresponds to a difference in the fin pitch p. (The pitch p is small at the upstream side and great at the downstream side.) Thus, the difference in the fin pitch p between the upstream side of the tube and the downstream side thereof is effective for reducing the increase in pressure loss while insuring a high heat transfer efficiency by the agitating action of fins.

The ethylene producing reactor tube which is improved in heat transfer efficiency by the provision of fins on its inner surface makes it possible to greatly increase the production capacity of the thermal cracker and to render the cracker compact in design and easy to operate and maintain. Since the fluid inside the tube can be rapidly heated to a thermal cracking temperature up to the central portion of the tube, the fluid can be fed through the tube at as high a velocity as is the case with a tube of reduced diameter, and the increased tube diameter and high-velocity feeding of the fluid result in the advantage of affording a greatly increased production capacity when the equipment remains unchanged in scale.

Furthermore, it becomes possible to greatly shorten the length of the tube without impairing the production capacity. For example, a comparison of the test tube A of FIG. 7 with the test tube B of FIG. 8 reveals that the latter requires a residence time for the fluid inside the tube to pass through about 4/5 of the entire tube length when the fluid is to be heated to the thermal cracking temperature up to the axial portion of the tube, whereas in the latter case, a residence time corresponding to about 2/5 of the entire tube length permits the fluid to be heated to the cracking temperature up to the axial portion. This suggests that for use as a reactor tube for producing ethylene, the former test tube can be shortened to about one-half of the latter or shorter in length while remaining equivalent to the latter in ethylene production capacity, consequently making it possible to compact the thermal cracker in design.

Further unlike conventional reactor tubes which are improved in thermal transfer efficiency by a decrease in diameter, the tube of the invention can be assured of a high thermal transfer efficiency although having a relatively large diameter, so that the same production capacity can be provided by a smaller number of tubes than in the prior art.

For example, the increase in diameter from the test tube C (38 mm in diameter D) to the test tube A (60 mm in diameter D) reduces the number of reactor tubes to be installed in the cracker to one half or smaller.

The heat exchange tube of the present invention is prepared from a tubular body made of a heat-resistant alloy (such as 25Cr-20Ni (SCH22), 25Cr-35Ni (SCH24) or Incolloy) which is selected according to the use and operating conditions by forming fins of heat-resistant alloy on the inner surface of wall of the tubular body by overlaying such as powder plasma-arc welding, or inert gas arc welding with use of a consumable or non-consumable electrode. The fins are formed as a helical projection or annular projections by rotating the tubular body about its axis and continuously or intermittently moving the welding torch axially of the tubular body for the welding operation.

The heat exchange tube of the present invention achieves an exceedingly high heat transfer efficiency as the uniform agitating-mixing effect produced on the fluid inside the tube by the fins on the tube wall inner surface, and is assured of this high efficiency even when having a large diameter without necessitating a reduction in the tube diameter. Accordingly when used as the reactor tube of the thermal cracker for the production of ethylene, the tube gives a greatly increased capacity to the cracker because the fluid can be fed therethrough at a high velocity and because of the increased tube diameter, renders the cracker compact in design when the tube has a shortened length and makes the cracker easy to operate and maintain through a reduction in the number of tubes installed in the cracker.

Additionally, the heat exchange tube of the present invention is also useful, for example, as a boiler tube for producing steam, superheater tube for municipal refuse incinerators for generating electricity, radiant tube for heat-treating furnaces for steel materials, preheater tube for manufacturing reduced iron, etc. Because of the high heat transfer efficiency, the present tube makes the equipment increased in capacity, compact in construction and easier to operate and maintain.

What is claimed is:

1. A thermal cracking tube adapted to be directly heated in a thermal cracking furnace and for producing ethylene, or ethylene and propylene, said tube comprising:
   a tube wall made of a heat-resistant alloy and having an inner surface which defines a passage for flow of a hydrocarbon material in a single-phase, gaseous form therethrough at a high velocity and a high temperature in order for a thermal cracking reaction to occur in said tube;
   means for agitating said hydrocarbon material which passes through said passage to distribute said gaseous materials across an entire transverse cross section of said passage, said agitating means being in a protruded form and located on the inner surface of the tube wall in a direction intersecting a longitudinal axis of the tube to mix said gaseous materials flowing along said passage into a substantially uniform mixture to create a generally uniform temperature profile across an entire transverse cross section of said passage; and
   said agitating means being formed in a plurality of regions arranged from an inlet end of the tube to an outlet end thereof axially of the tube, said agitating means having a suitable pitch and suitable spacing between adjacent regions.

2. The thermal cracking tube as defined in claim 1, wherein each of said regions has an axial length of at least 1 m in order for the thermal cracking operation of said hydrocarbon material to be accomplished effectively.

3. The thermal cracking tube as defined in 1, wherein said agitating means in at least one region have a different one of said suitable pitch and said suitable spacing from those in other regions.

4. The thermal cracking tube as defined in claim 1 wherein each of said regions has an axial length of at least one meter in order for the thermal cracking operation of said hydrocarbon material to be accomplished effectively.

5. A thermal cracking tube, comprising:
   a cylindrical tubular member having an inner surface defining a passage for conducting pressurized single phase gaseous hydrocarbon materials at elevated velocity and temperature effective to create a thermal cracking reaction therein for producing ethylene;
   means for distributing said gaseous materials across a transverse cross section of said passage to produce a substantially uniform temperature distribution of the gaseous materials at a desired thermal cracking temperature over the entire tubular member cross section, said means including:
      fins disposed on said inner surface of said tubular member and projecting in a direction substantially intersecting a longitudinal axis of said tubular member and operative to deflect said gaseous materials flowing along said passage into a substantially uniform temperature profile in relation to said entire transverse cross section of said passage,
      said fins being arranged in said tubular member between an inlet end and an outlet end thereof, and
      said fins being in at least one of a continuous, helical form having a suitable angle of inclination and an annular, axially spaced form having a suitable spacing for obtaining desired mixing while restricting pressure loss in said hydrocarbon materials.

6. The thermal cracking tube as defined in claim 5, wherein said fins are formed in at least three separate regions arranged from an inlet end of said tube to an outer end thereof axially of said tube, and said fins disposed in any one region have a different suitable spacing with respect to said fins in an adjacent region.

7. A thermal cracking tube as defined in claim 5 wherein said tubular member contains a plurality of regions and wherein the axial spacing between adjacent fins is different in one region than in an adjacent region.

8. A thermal cracking tube as defined in claim 7 wherein said tubular member contains at least three regions axially arranged from an inlet end of said tube to an outlet end thereof.

9. A thermal cracking tube as defined in claim 7 wherein each said region has an axial length of at least one meter.

* * * * *